March 22, 1955   J. J. CHRISTENSEN   2,704,564
ANTI-SKID TIRE AND DEVICE
Filed Sept. 10, 1952
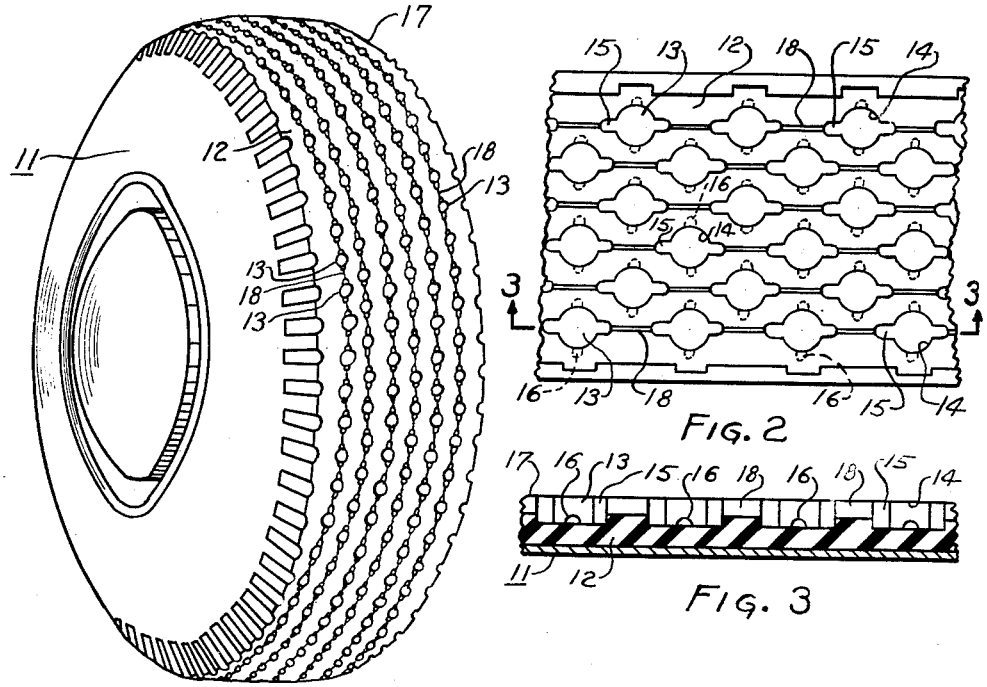
Fig. 1
Fig. 2
Fig. 3
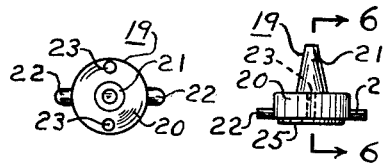
Fig. 4   Fig. 5   Fig. 6
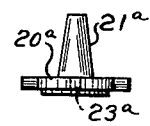
Fig. 7
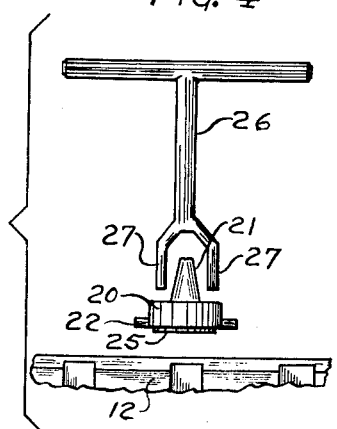
Fig. 11
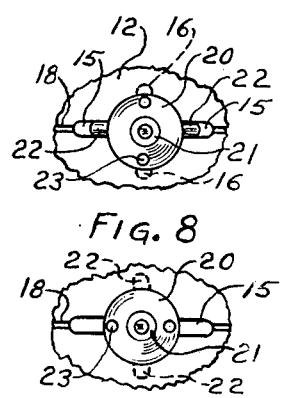
Fig. 8
Fig. 9
Fig. 10
INVENTOR.
JENS JUUL CHRISTENSEN
BY
ATTORNEYS

United States Patent Office 2,704,564
Patented Mar. 22, 1955

2,704,564
ANTI-SKID TIRE AND DEVICE
Jens Juul Christensen, Cleveland, Ohio Application September 10, 1952, Serial No. 308,732

16 Claims. (Cl. 152—210)

My invention relates to anti-skid devices and tires constructed to carry such anti-skid devices for resisting skidding of the tires.

An object of my invention is the improved construction of an anti-skid device adapted for ready mounting on and demounting from a tire.

Another object is the provision of an improved tire construction arranged for receiving and holding anti-skid devices to protrude from its tread surface.

Another object is the provision of an improved combination of tire and anti-skid device so arranged in construction and assembly as to produce a unique and useful manner of assembly and improved results in resisting skidding.

Another object is the provision of an anti-skid device constructed to provide a maximum of protection against skidding and readily adaptable for mounting on and demounting from a tire.

Another object is the provision of a unique arrangement for connecting anti-skid devices to a tire to hold them firmly and yet resiliently to protrude outwardly from the maximum circumferential surface of the tire to engage the surface being traveled by the tire.

Still another object is the provision of an anti-skid device which resists wear and which provides for resilient reaction between the tire and the surface being traveled by the tire.

Other objects and a fuller understanding of the invention may be had by referring to the accompanying drawing, in which:

Figure 1 is a perspective view of a tire formed with recesses for holding my anti-skid device in position;

Figure 2 is a plan view looking down upon the tread of my improved tire shown in Figure 1;

Figure 3 is a cross-sectional view of the tread portion of my tire and is taken along the line 3—3 of Figure 2;

Figure 4 is a plan view of one of my anti-skid devices;

Figure 5 is a side elevational view of my anti-skid device;

Figure 6 is a cross-sectional view of the device shown in Figure 5 and is taken along the line 6—6 of Figure 5;

Figure 7 is a side elevational view of a modified form of my anti-skid device;

Figure 8 is a partial plan view of the tire tread with one of my anti-skid devices in one of its positions prior to being anchored to the tire;

Figure 9 is a partial plan view similar to that of Figure 8 and showing the anti-skid device turned from its position in Figure 8 to its anchored position;

Figure 10 is an enlarged view partially in section of a portion of the tire tread showing the position of the anti-skid device in the tread; and Figure 11 is a view illustrating the manner of mounting and demounting an anti-skid device in the tire tread.

In the preferred form of my invention a tire, denoted generally by the reference character 11, as shown in Figure 1, has formed in the tread 12 thereof, made of rubber or other rubber-like material, a plurality of recesses 13 regularly spaced around the tire. The recesses 13 open up to the outer circumferential surface of the tire and extend radially of the tire into the tread 12. The spacing and arrangement of the recesses 13 are illustrated in Figures 1, 2, and 3.

Each recess 13 has a main round body portion with arcuate walls 14. Extending out from opposite ends of each round body portion are keyways or slots 15. The keyways or slots 15 are of the same depth as the round body portion defined by the arcuate walls 14. Connecting the recesses in alignment around the tire are grooves 18 which are relatively narrow and extend down into the tire tread only a fraction of the depth of the round body portions 13 and keyways 15, as is seen in Figure 3. The grooves 18 between the aligned recesses provide air passages which effect certain improved sound characteristics and other operating advantages to the tire tread.

Extending into the arcuate wall 14 of each recess 13 are oppositely disposed indentations or undercuts 16. The indentations or undercuts 16 are disposed at about 90 degrees out of phase to the location of the keys or slots 15. The position of the indentations 16 is shown in dotted lines in Figure 2 and is shown as positioned at the bottom of each recess 13 in Figure 3. Above each indentation 16 there is a roof of rubber-like material, of which the tire tread is made. Each indentation 16 is disposed radially inward of the tire from its outer circumferential surface 17 at the outer face of the tire tread.

The preferred form of my anti-skid device is shown generally by the reference character 19 in Figures 4, 5 and 6. The anti-skid device has a base portion 20 of generally round or cylindrical shape. Extending upwardly from the base portion 20 is a frustro-conical shaped stud portion 21. Protruding out from opposite sides of the base portion 20 are lugs, prongs or projections 22, which are disposed beyond the circumference of the round body portion 20.

The anti-skid device 19 is made of a shell of metal and may well be made of a metal stamping or may be a machined part. The shell is preferably hollow with an open bottom. The interior of the shell is filled with a hard and wear-resisting rubber body 24, the body 24 filling the conical stud portion as well as the base portion. The lower end of the rubber body 24 extends downwardly to form a projecting base portion 25 of rubber-like material on the bottom of the anti-skid device. The rubber-like material of the rubber body 24, including the protrusion 25, is resilient in nature and is also relatively wear-resistant. The protrusion 25 provides a resilient support for the anti-skid device and helps prevent the edge of the shell from wearing or cutting into the rubber bottom of the recess 13 of the tire tread. The rubber within the stud portion 21 provides for wear resistance as the top of the stud portion wears away exposing the rubber-like material within the walls of the stud portion. The rubber surrounded by the metal walls of the stud portion provides for a construction and material which resists wear as the tire travels the road surface.

To provide for rotating the anti-skid device, I provide two small holes 23 which extend through the shell of the device and through the rubber body 24. The walls of these two holes 23 provide engaging means for grasping the device and for rotating the device.

In Figure 11 is shown a tool 26 which may be used for handling the anti-skid device in mounting and demounting it on and from the tire. The tool 26 has two spaced tines or prongs 27 adapted to be inserted into the small holes 23 in the anti-skid device. By frictional engagement, the tool may raise the anti-skid device upwardly and hold it as desired. Upon turning of the handle 26 the anti-skid device carried on the ends of the tines 27 may be rotated to the desired position.

To mount one of my anti-skid devices, the device may be placed upon the tool 26 in the position shown in Figure 11. The device may then be lowered by the tool 26 into the recess 13 with the lugs or prongs 22 in alignment with the keys or slots 15, as illustrated in Figure 8. With the bottom of the anti-skid device firmly pressed upon the rubber or resilient bottom of the recess 13, the handle of the tool 26 is rotated about 90 degrees. This rotates the anti-skid device in the recess to yieldably force the lugs 22 to a position 90 degrees out of phase with the position of the keys 15 and into the indentations 16. A certain amount of force is required to rotate the anti-skid device to force the lugs 22 against the yielding rubber-like material of the arcuate wall 14 of the recess. By forcibly rotating the anti-skid device, the arcuate wall yields to permit the lugs 22 to move from the position shown in Figure 8 to the position shown in Figure 9. When in the position of Figure 9, the lugs 22 are anchored within the indentations 16 and under the resilient roof provided by the rubber-like material of the tread disposed radially outward of the indentations 16. The size of the lugs 22 is proportioned to the size of the recess, the play or spacing between the walls of the recess and the base portion 20, and also upon the yielding characteristics of the rubber-like material of which the tread is composed and which forms the arcuate wall 14.

To demount or remove the anti-skid device from its accommodating recess 13, the operation is reversed in that the anti-skid device is turned from its position shown in Figure 9 to its position shown in Figure 8 and then the anti-skid device is lifted out of the recess. To turn the anti-skid device from its positions shown in Figure 9 to that shown in Figure 8 similarly requires some force to overcome the yielding and resilient nature of the rubber-like material encountered by the lugs 22 in revolving from their place in the indentations 16 to the keys 15.

The position of the anti-skid device in a recess of the tread is shown in section in Figure 10. The base portion 20 is located within the round body portion of the recess 13 and is embraced by the arcuate wall 14 near the bottom wall of the recess. At the plane of the outer circumferential surface 17, the stud device is spaced from the arcuate wall. The stud portion 21 extends substantially outwardly of the tire beyond the outer circumferential surface 17 of the tire tread 12 in a position to engage the surface being traveled by the tire. Each stud device is resiliently held or anchored in position by the lugs 22 within the indentations 16 and so resists centrifugal force as the tire is revolved. The anchoring of the stud and its engagement within the recess 13 also provides for resilient resistance to tilting of the anti-skid device while allowing some play between the anti-skid device and the wall of the recess. The structure and arrangement is particularly adapted for firmly holding the anti-skid device in position and at the same time for meeting the various forces encountered by the anti-skid device as the tire revolves and meets the surface being traveled. Pressure upon the anti-skid device at the time of skidding, acceleration and braking, as well as inwardly directed force when the tire rests upon a particular anti-skid device, is resiliently met and accommodated by the arrangement and structure here disclosed.

In Figure 7 there is a slight modification in the form of the anti-skid device showing the base portion 20 as of relatively low height. In this modified form, the base portion 20 is denoted by the reference character 20–a, the stud portion is denoted by the reference character 21–a and the holes are denoted by the reference character 23–a. In this arrangement, the stud portion is increased in length relative to the height of the base portion 20–a.

It is to be understood, of course, that there are a plurality of recesses 13 spaced around the circumferential extent of the tire and across the tread of the tire in any desired arrangement and preferably in the arrangement illustrated in the drawing. An anti-skid device may be mounted in each of the recesses or in such number of the recesses in the tire as may be desired. In some situations a larger number of anti-skid devices may be mounted in the tire than in other situations, depending upon conditions to be encountered. It is preferable that the anti-skid devices be uniformly arranged and spaced in various locations around the extent of the tire and across its breadth.

The present disclosure includes the disclosure contained in the appended claims as well as the description of the specific embodiment above described and shown in the drawing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In combination with a vehicle tire of rubber-like material, a plurality of separate road-gripping devices independently mounted in said tire to protrude outwardly beyond the maximum circumference of the tread of the tire in its normal expanded and rounded condition, said tire having a plurality of recesses each adapted to accommodate a said road-gripping device, said recesses being located at intervals around the tire and opening at the outer circumferential surface of the tire tread, each recess having a bottom wall and a side wall of said rubber-like material, said side wall having a cylindrical portion and a key portion, each said recess having an indentation extending laterally of said recess from the cylindrical portion of said side wall and under the rubber-like material of said tread, each road-gripping device having a round base portion complementing the cylindrical portion of said side wall and engaging the bottom wall of a respective recess, and a securing portion extending laterally outward from said base portion movable through said key portion upon insertion of the device into said recess and revolvable into said indentation and under said rubber-like material upon rotation of said device in a said recess to resiliently resist radially outward movement of said device from the respective recess, and a frustro-conical portion extending radially outward from said base portion, the major length of said frusto-conical portion of each device extending radially outward beyond the maximum circumference of the tread of the tire, the engagement of the base portion of each device upon the bottom wall of a respective recess providing for resilient absorbing of radially inward-directed force upon said frustro-conical portion of said device and the resilient resistance to tilting of the device upon travel of the tire along a road surface gripped by the protruding frusto-conical portions of said devices.

2. The combination of a tire having a tread portion of rubber-like material, said tire having a plurality of recesses spaced at intervals around the tread and extending inwardly from the outer circumferential surface of the tire, each of said recesses having a bottom wall of said rubber-like material, an arcuate side wall of said rubber-like material extending outwardly from said bottom wall, and a key portion extending outwardly from said arcuate side wall, said arcuate side wall having an indentation extending under the rubber-like material of said tread and having a roof of said rubber-like material disposed radially outward from said indentation, said indentation being out of phase with said key portion, and a plurality of anti-skid devices each mounted in a said recess, each said device being unbonded to said rubber-like material and manually removable from a said recess, each said device having an arcuate base portion engaging said bottom wall and side wall of a respective recess to provide for resilient resistance by said walls to radial inward and lateral thrust on said device, each said device having a projecting portion extending laterally from said base portion and into said indentation under said roof, said projecting portion being movable through said key portion upon insertion into or removal from said recess and being movable into and out of said indentation upon rotation of said device in said recess, the rubber-like material of said roof providing resilient resistance to radially outward movement of said device, each said device having a stud portion projecting radially outward from said base portion and extending substantially beyond the outer circumferential surface of the tread in rounded condition of said tire, said stud portion being laterally spaced from the side wall of the respective recess at said circumferential surface, the said stud portion being adapted to engage the surface being traveled by said tire, each said device being removable from a respective recess by withdrawing said projecting portion from the indentation of said recess.

3. The combination of a tire of rubber-like material and a plurality of anti-skid devices protruding radially outwardly of said tire to engage the surface being traveled by the tire, said tire having a plurality of recesses formed in its outer circumferential surface, each said recess having a bottom wall and an arcuate side wall of said rubber-like material, said side wall being relieved to provide a roof of rubber-like material adjacent said recess, said plurality of anti-skid devices being mounted in said recesses respectively, each of said devices having a round base portion engaged by the bottom wall and side wall of the respective recess at a location radially inwardly of said circumferential surface, each said base portion having an anchoring portion extending laterally therefrom under said roof of rubber-like material, said anchoring portion being movable in and out under said roof upon rotative movement of said base portion relative to said bottom wall and side wall of the respective recess to laterally move said anchoring portion in an arc and under said roof, each said device having a stud portion projecting radially outwardly from said base portion and extending radially outward of said recess beyond the maximum circumferential surface of the tire in rounded condition, the outer wall of said projecting portion being spaced from said side wall of the respective recess at the plane of said maximum circumferential surface, the arrangement of said tire and devices providing for resilient retention of said devices by said tire and the resilient resistance by said tire to the forces encountered by said tire in travel.

4. The combination of a tire of rubber-like material and a plurality of anti-skid devices protruding radially outwardly of said tire to engage the surface being traveled by the tire, said tire having a plurality of recesses formed in its outer circumferential surface, the walls of each recess defining an inner area and an outer area radially outward of said inner area, and communicating therewith, said inner area having an annular portion, the shape of said inner area being different from the shape of said outer area to provide an overlay of rubber-like material radially outward of said inner area and adjacent said inner area, each of said anti-skid devices having a base portion positioned in a respective recess, said base portion having an annular shape complementarily fitting in the annular portion of said inner area of said recess to provide for rotation therein and having an anchoring portion protruding laterally therefrom and disposed under the said overlay of rubber-like material, said base portions being unbonded to said rubber-like material and being removable from said recesses by lateral movement of said anchoring portion from under said overlay of rubber-like material, each of said anti-skid devices having a stud portion protruding radially outward of the tire from a said base portion in a respective recess to extend substantially beyond the outer circumferential surface of the tire, said stud portion having a cross-sectional area at said circumferential surface substantially less than said outer area of the respective recess at said circumferential surface to provide for resilient lateral movement of said stud portion relative to the walls of the respective recess at said circumferential surface.

5. The combination of a tire of rubber-like material and a plurality of anti-skid devices protruding radially outwardly of said tire to engage the surface being traveled by the tire, said tire having a plurality of radially extending recesses opening to the outer circumferential surface of the tire, each said recess having a bottom wall and a round side wall, said side wall having an indentation under the rubber-like material at said surface and projecting laterally of said recess adjacent said bottom wall, each said anti-skid device having a round base portion resiliently engaging the bottom wall of a respective recess, said base portion having an anchoring portion extended laterally therefrom and into a said indentation, said base portion and anchoring portion being unbonded to said rubber-like material, said base portion and anchoring portion together having a non-circular contour and said recess and indentation together having a complementary non-circular contour, said base portion and anchoring portion being revolvable in a said recess to force said anchoring portion against the yielding rubber-like material of said side wall and into said indentation to resiliently anchor the base portion in a said recess, each said base portion having a stud portion projecting therefrom and radially of the tire beyond its outer circumferential surface, each said stud portion being spaced from the said side wall of the respective recess at said circumferential surface to permit resilient tilting of the anti-skid device.

6. The combination of a tire of rubber-like material and a plurality of anti-skid devices protruding radially outward of the tire to engage the surface traveled by the tire, said tire having a plurality of spaced and radially extending recesses at its outer circumferential surface, each recess having an arcuate side wall and a keyway disposed in said arcuate wall, said arcuate wall having an indentation therein spaced radially inward of said surface and positioned at about 90 degrees out of phase with said keyway, each said device having a round base portion and a key extending laterally outward from the base portion, each said device having a frustro-conical stud portion extending from said base portion and outwardly of the respective recess to protrude from said tire, said base portion being disposed in a respective recess adjacent said arcuate walls, the disposition of the base portion to align the said key with said keyway permitting withdrawal of the device from the respective recess and the disposition of the base portion to insert said key in said indentation anchoring said device in the respective recess.

7. An anti-skid device adapted for mounting in a tire having a recess formed in its outer tread surface, said recess having an arcuate portion, opposed key portions extending from said arcuate portion and opposed laterally disposed indentations extending from said arcuate portion and spaced at about 90 degrees out of phase from said key portions, said device comprising a round base portion positionable in the arcuate portion of said recess, oppositely extending lugs extending laterally from said round base portion, and a stud portion extending upwardly from said base portion and being adapted to protrude from said recess, said device being movable in and out of said recess radially of the tire upon alignment of said lugs with said keys, said device being lockable in said recess upon rotating the device in said recess to move said lugs into said indentations.

8. An anti-skid device adapted for mounting in a tire having a round recess formed in its outer tread surface, said recess having an undercut on a side thereof, said device comprising a round base portion positionable in said recess, said base portion having an integral projecting edge portion on a side thereof adapted to be positioned in said undercut upon rotation of said base portion in said recess, and a stud portion extending upwardly from said base portion, said device being movable in and out of said recess radially of said tire upon rotation of said base portion and revolving withdrawal of said projecting edge portion from said undercut, said device being lockable in said recess upon revolving movement of said projecting edge portion into said undercut.

9. An anti-skid device adapted for mounting in a tire having a recess, said recess having a cylindrical body portion, a pair of key portions and a pair of indentations displaced from said key portions, said device comprising a round base portion positionable in said body portion of the recess, a pair of lugs extending laterally of, and on opposite sides of, said base portion and movable in said key portions radially of the tire, said lugs being movable from said keys to within said indentations, respectively, upon rotation of said base portions in said recess to lock the device against radially directed withdrawal from said recess, and a stud portion extending from said base portion to protrude from said tire upon positioning of the said base portion in said recess.

10. An anti-skid device for mounting in a tire having a round recess in its outer circumferential surface, said recess having opposed openings in the walls thereof, said device comprising a round base portion adapted to engage the bottom of said recess, lug portions extending laterally from said base portion to be disposed in said openings upon rotation of said device in a said recess for resisting removal of the device radially of the tire, and a stud portion extended upwardly from the base portion to project from said recess.

11. An anti-skid device to be mounted in a tire, said device having a metal shell and a body of wear-resistant rubber-like material embedded in said shell, said shell having a frusto-conical stud portion substantially filled with said rubber-like material, wear of the shell exposing the rubber-like material in said stud portion to the surface traveled by the tire, said shell supporting said rubber-like material and said rubber-like material providing wear resistance to said stud portion.

12. An anti-skid device to be mounted in a tire, said device comprising a hollow metal shell having a cylindrically shaped base portion, a frusto-conical shaped stud portion extending upwardly from the base portion, and a pair of lug portions extending laterally outward from said base portion to anchor to said tire, said base portion having an open end, and a body of wear-resistant and resilient rubber-like material in said shell, said body in said stud portion being exposed to wear as the shell of the stud portion wears and the said body extending through said open end to provide a resilient base for said device.

13. The combination of a tire having a tread portion of rubber-like material, said tire having a plurality of recesses spaced at intervals around the tread and extending inwardly from the outer circumferential surface of the tire, each said recess having a bottom wall of said rubber-like material and a side wall of said rubber-like material, said side wall defining a round portion and oppositely disposed key portions opening into said round portion, and a plurality of anti-skid devices each mounted in a said recess, each said device being unbonded to said tire and manually removable from said recess, each said device having a base portion disposed in the round portion of said recess and engaging said bottom wall and engaging said side wall adjacent said bottom wall, each said device having oppositely disposed projecting portions extending laterally of said base portion, said projecting portions being extended into said tread portion from said round portion of said recess to anchor the base portion in said recess, said projecting portions being revolvable in said tread portion to anchored and unanchored positions by rotating the base portion in said recess and being movable in and out of said recess upon registration of the projecting portions and said key portions, each said device having a stud portion projecting radially outward from said base portion and extending substantially beyond the outer circumferential surface of the tread in rounded condition of said tire, the said stud portion being adapted to engage the surface being traveled by said tire, each said device being removable from a respective recess by rotating the device to register said projecting portions with said key portions and outward withdrawal of the device.

14. For mounting in a tire having a plurality of recesses in its tread surface, each recess having a round portion and spaced key portions extending therefrom, an anti-skid device comprising a round base portion adapted to be accommodated in said recess round portion, a plurality of lug portions spaced from each other and extending laterally outward from said base portion for registration with, and movement through, said recess key portions, a stud portion extending upwardly from said base portion and outwardly of said recess, and a tool-engaging portion adapted to be engaged for rotating said device in said recess.

15. An anti-skid device to be mounted in a body engaging in travel a relatively fixed surface, said device having a shell of relatively hard and non-resilient material and a body of wear-resistant rubber-like material embedded in said shell, said shell having a frusto-conical stud portion substantially filled with said rubber-like material, wear of the shell exposing the rubber-like material in said stud portion to the said surface, said shell supporting said rubber-like material and said rubber-like material providing wear resistance to said stud portion.

16. An anti-skid device to be mounted in a body engaging in travel a relatively fixed surface, said device comprising a hollow shell of relatively hard and non-resilient material, said shell having a round base portion, a frusto-conical shaped stud portion extending upwardly from said base portion, and a plurality of lug portions extending laterally of said base portion to anchor the device to said body, said base portion having an open end, and a body of wear-resistant and resilient rubber-like material in said shell, said body in said stud portion being exposed to wear as the shell of the stud portion wears and the said body extending through said open end to provide a resilient base for said device.

References Cited in the file of this patent
UNITED STATES PATENTS

| | | |
|---|---|---|
| 2,267,406 | Krusemark | Dec. 23, 1941 |
| 2,535,299 | Leach | Dec. 26, 1950 |
| 2,603,268 | Brown | July 15, 1952 |